March 20, 1945.  T. O. LILLQUIST  2,371,832
DIESEL ELECTRIC DRIVE AND CONTROL SYSTEM
Filed April 23, 1940
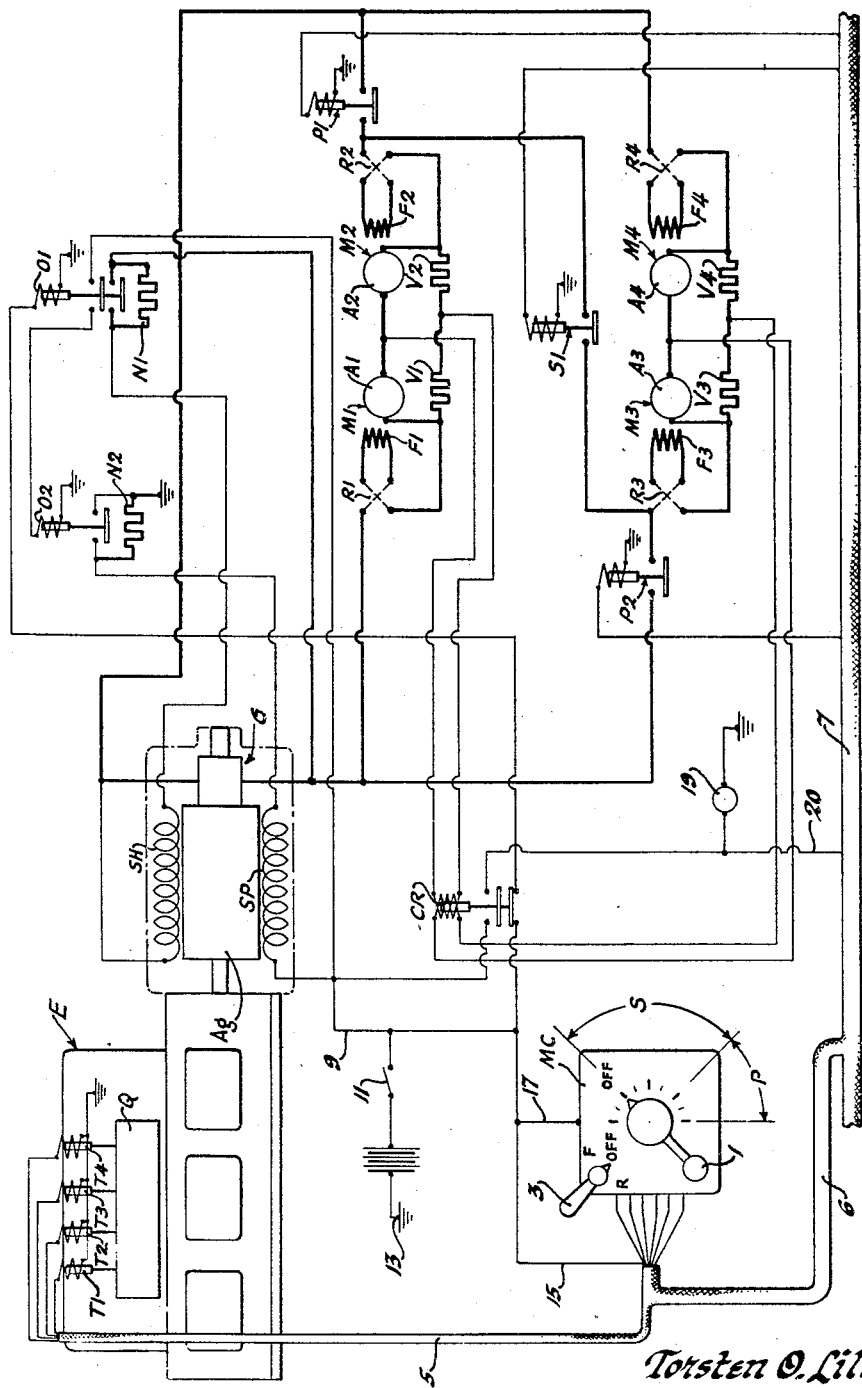
Inventor
Torsten O. Lillquist
By
Blackmore, Spencer & Flick
Attorneys Patented Mar. 20, 1945

2,371,832

UNITED STATES PATENT OFFICE 2,371,832

DIESEL ELECTRIC DRIVE AND CONTROL SYSTEM

Torsten O. Lillquist, Clarendon Hills, Ill., assignor to General Motors Corporation, Detroit, Mich., a corporation of Delaware Application April 23, 1940, Serial No. 331,206

9 Claims. (Cl. 290—17)

The present invention relates, generally, to a Diesel electric drive and control system and particularly to control means for preventing overspeeding of the driving means upon a sudden reduction in the load thereon.

In drive systems comprising a prime mover mechanically connected to drive an electric generator supplying power to one or a plurality of driving motors which are mechanically connected to individual driving shafts, such as the axles of a locomotive or propeller shafts of a ship, it is necessary to provide control means for preventing overspeeding of any motor so that damage to the motors and the mechanism driven thereby is prevented. On locomotive vehicles where the coefficient of friction between the driving wheel and the rail varies widely, as does the torque on the wheel, it is apparent that slippage of any wheel will result in damage to the wheel as well as the rail, and the motor driving this wheel may also be damaged by excessive overspeeding. On ships a similar problem is present when the propeller is moved out of the water by rolling or pitching of the ship. The usual manual control means for regulating the power input to the motors aids in preventing overspeeding and damage thereto but cannot be operated quickly enough to prevent excessive speeds of the motors under certain conditions. On locomotives, for example, wheel slip alarm means are usually provided to warn the locomotive engineer when wheel slippage occurs, but in the time required for the engineer to adjust the controls to reduce the power input to the motors they may build up to an excessive value of speed for certain conditions of the rail. The reduction of input to all the motors reduces the torque of all the motors and accordingly reduces the tractive effort of the locomotive and the speed of it and the train pulled thereby, and generally requires restarting of the locomotive and train. The conventional manual control means does not include means whereby the power input to any one motor or any one group of motors may be reduced independently in order to allow the other motors to continue to operate at full torque.

The object, therefore, of this invention is to provide means which act instantaneously and automatically in response to slight differences in speed occurring between the driving motors of a group to reduce independently the power input to one group of motors to prevent overspeeding of any one motor in the group, thus allowing certain other groups of motors to operate at full torque. The means by which the above object and other objects related thereto are accomplished will be better understood by referring to the following detailed description of my invention and the single drawing accompanying this description.

Referring now to the drawing which shows in diagrammatic form a single generating electric drive and control system therefor embodying the features of the invention, as will be described, a plurality of such systems interconnected and operating in multiple and either located on a single vehicle or a plurality of coupled vehicles, all of which may be controlled from a single master controller, provide advantages over and above conventional systems now in use. A plurality of driving motors are generally indicated at M1, M2, M3 and M4, each having armatures A1, A2, A3 and A4 and field excitation windings F1, F2, F3 and F4 respectively. The armatures may be connected mechanically to drive individual driving shafts or axles of a vehicle, not shown, in any well known manner. The armatures A1 and A2 are shown electrically connected in series and each is connected in series with its respective field winding F1 and F2 through reversing switches R1 and R2. The armatures A3 and A4 are similarly connected to one another and to their respective field windings F3 and F4 through reversing switches R3 and R4. Power connections including electromagnetically actuated contactors S1, P1 and P2 are provided to connect the motors M1 and M2 in series or parallel with the motors M3 and M4. Each of these contactors include contacts and an armature movable into bridging relation therewith by an electromagnetic winding having one side grounded and the other side connected to a master controller MC by which they may be selectively energized, as will be explained. The contactor S1, when energized, connects the motors in series and is shown connected in series between the reversing switches R2 and R3, and the contactors P1 and P2, when energized, simultaneously serve to connect each pair of motors in parallel across a source of power as they have their respective contacts connected in series between opposite terminals of a suitable power source and each of the reversing switches R2 and R3.

The power source for the motors is shown as a generator G having an armature Ag, each terminal of which is connected respectively to a contact of each of the contactors P1 and P2. The generator armature is mechanically connected to and driven by a prime mover E of any well known type such as a Diesel engine.

The generator has a shunt field winding SH, having a resistance N1 in series therewith and a separately excited field winding SP connected in series with a battery and a resistance N2. Electromagnetic contactors O1 and O2 serve to insert or shunt out the resistances N1 and N2 to control the power output of the generator G and therefore the power input to the motors when they are connected to the generator by the above described contactors. Each of the contacts of the contactor O2 is shown connected to opposite sides of the resistance N2 and the armature thereof is capable of moving upwardly into bridging relation with these contacts when the actuating winding is energized. The contactor O1 is provided with two pairs of contacts, one pair being connected in series between the battery and the winding of the contactor O1 and each of the other pair of contacts being connected to opposite sides of the resistance N1. The contactor O1 has two armatures movable upward simultaneously into bridging relation with each pair of contacts upon energization of the actuating winding of this contactor. Suitable insulation, not shown, is provided to prevent current flow between the armatures.

The power output of the prime mover E is under control of output regulating means shown generally at Q, comprising any well known means for regulating the prime mover power output such as a governor driven by the prime mover having an element movable in response to slight variations in speed and load of the prime mover which may be operatively connected to the motive fluid regulator of the prime mover to maintain substantially constant speed and output. If desired the governor may also serve in a well known manner to regulate the excitation of the generator to prevent overloading of the prime mover. Governor setting means may be provided whereby the prime mover speed and output may be set at any one of a plurality of values. The prime mover output controlling means shown comprises electromagnetic devices T1, T2, T3 and T4. Each of these devices includes a plunger which may be operably connected to the governor setting means or to the prime mover motive fluid regulator, not shown, in any well known manner, and the electromagnetic winding when energized causes movement of the plunger. The windings of these devices may be energized separately and in combination whereby the speed and output of the prime mover may be regulated to any one of a plurality of values. The electromagnetic windings of these devices have one side grounded and individual conductors from the other sides thereof are connected to a master controller MC.

The master controller MC has an operating handle 1 which is movable to a plurality of positions in the ranges indicated at S and P to control energization of the electromagnetic devices T1 to T4 and also the contactors S1, P1 and P2, each of which has individual control conductors extending from one side of the electromagnetic winding of these devices to the master controller, as has been previously described. A reverse lever 3 is shown on the controller which is movable to a forward or reverse position indicated at F and R for operating all the reversing switches R1 to R4 simultaneously in any well known manner. Any type of actuating means such as electromagnetic or electropneumatic means, not shown, having individual control conductors, not shown, extending to and connected to the master controller for energization upon movement of the lever 3 to the forward or reverse positions, may be used to cause movement of the reversing switches to the forward or reverse positions. The individual control conductors from the electromagnetic devices T1 to T4 and the windings of the contactors S1, P1 and P2 together with the conductors described but not shown for energizing the means for controlling or actuating the reversing switches R1 to R4 are carried in conduits 5, 6 and 7, and parallel conductors attached to each of these individual conductors are connected to the master controller as shown. The individual conductors from the electromagnetic devices T1 to T4 are shown entering the conduit 5 and continue through the conduit 6 to the conduit 7 which also contains the individual conductors from the electromagnetic contactors S1, P1 and P2. The conduit 7, therefore, serves as a train line conduit containing conductors extending from end to end thereof and having connections with each of the individual conductors of the devices T1 to T4 and S1, P1 and P2, together with the conductors described but not shown for energizing means, not shown, for controlling or actuating the reversing switches R1 to R4. A conductor 9 serves as a battery bus and is shown connected to a battery switch 11 which is connected in series with one terminal of the battery, the other battery terminal being grounded at 13. The separately excited field winding SP is shown connected to the bus 9 which also extends to one contact of the upper pair of contacts of the contactor O1. A conductor 15 connected to the bus 9 is shown entering the conduit 6 and is connected with a conductor, not shown, extending from end to end of the train line conduit 7. A branch conductor 17 is connected between the conductor 15 and the master controller. With the above described control arrangement for the drive system shown, including the prime mover, generator, master controller, and a plurality of driving motors, it will be evident that any number of such drive systems having similar control connections may be connected in multiple with the individual conductors in the train line conduits and any number of drive systems may be controlled by movement of any control handle 1 or any reversing lever 3 of any master controller MC. A plurality of such drive and control systems may be mounted on a single vehicle or may be mounted on other vehicles mechanically coupled together as desired.

In addition to the above manual control means, an automatic control means is also provided on each drive and control system to prevent overspeeding of any motor. This means consists of a sensitive differential control relay CR having two separate electromagnetic actuating windings each with the same number of turns and wound oppositely with respect to one another, and a plunger movable with respect to and by any difference in voltage across the windings. The plunger has two armatures attached thereto which are movable into bridging relation with one or another pair of contacts. The upper pair of contacts is connected in series between the battery bus 9 and a signal lamp 19, one side of which is grounded. A conductor 20 connected to the ungrounded terminal of the signal lamp extends into the train line conduit and may be connected to a signal conductor, not shown, extending from end to end thereof so that all the signal lamps of a number of drive systems may be connected in parallel. The lower pair of contacts of the relay is connected in series with the winding of contactor O1, one contact being connected to the bus 9 and the other to the ungrounded end of the winding of the contactor O1. One winding of the control relay CR is connected directly across the armatures A1 and A2 of the motors M1 and M2 and the other winding is connected in an identical manner across the armatures A3 and A4 of the motors M3 and M4. It will be noted that one side of each of the windings of the relay CR is connected to conductors extending between and connected to the right side of one motor armature and to the left side of the other motor armature of each pair of armatures, the other side of each winding of the relay being connected between resistance units which are connected in series between the other sides of each of the armatures of each pair of motors. The resistance units connected to the armatures A1 and A2 are indicated at V1 and V2 and those connected to the armatures A3 and A4 are indicated at V3 and V4. All of these resistances are identical and serve to limit the current flow in the windings of the relay CR to a low value. The above connections are such that when the speed of any armature varies slightly from that of the other armatures the back voltage generated, which is proportional to the speed of this armature, likewise varies and causes flow of current through the coil of the relay CR which is connected to this armature, which causes the armatures of the relay CR to be moved upward by the magnetic pull of windings so that the lower relay armature will be moved out of bridging relation with the lower pair of contacts and the upper armature will move into bridging relation with the upper pair of contacts. With the speed of all the motors equal, the back voltage generated by each armature will be equal, and the connections from the coils of the relay CR are such that no current will flow through either relay winding and the armatures of the relay will occupy the positions shown.

The operation of the above described drive and control system and others controlled in multiple therewith is briefly as follows:

With a plurality of drive and control systems, such as the one shown and described, having their individual control conductors connected in multiple in the manner described, the closure of any battery switch 11 causes one master-controller to be connected to the battery and all the conductors 15 which are connected together by means of conductors in the train line conduit to cause energization of all of the separately excited field windings SP of the generators of each drive system. Movement of the reverse lever 3 to a forward or reverse position causes all of the reversing switches R1 to R4 to move to connect all the motor fields F1 to F4 to the armatures A1 to A4 to cause either forward or backward rotation of all of the motors when the control handle 1 is moved in the series or parallel range indicated at S or P, which causes either the closure of contactors S1 for connecting the various groups of motors in series with their respecitve generators, or closure of both contactors P1 and P2 simultaneously which causes each pair of motors of a group to be connected in parallel across their respective generators. As has been described previously, movement of the control handle in either the series or parallel range likewise causes adjustment of all of the prime mover output regulating devices Q by the magnetic control devices T1 to T4 when they are energized separately or in combination, depending upon the position occupied by the control handle 1 in either the S or P range to regulate the power output of the prime mover E.

Closure of the switch 11 likewise causes energization of all of the windings of the contactors O1 through the lower pair of contacts of each of the control relays CR as they are normally bridged by their respective armatures. Energization of the winding of the contactor O1 causes upward movement of both armatures thereof; the lower armature moves into bridging relation with the lower pair of contacts, shunting the resistances N1 out of each of the shunt fields of the generators, while the upper pair of contacts of the contactors O1 are bridged by the upper armature, causing energization of all of the windings of the contactors O2. When the windings of these contactors are energized the armatures thereof are attracted and move upward, bridging their contacts to shunt out all of the resistances N2 in series with each of the separately excited fields SP of the respective generators G. With all of the resistances N1 and N2 thus shunted out the excitation current through both the shunt and separately excited field windings of the generators is maximum and the output thereof will be determined by the output and speed of the prime mover which may be adjusted to any one of a plurality of identical values, depending upon the position of the control handle 1. As long as the traction motors of a group are rotating at constant speed the back voltage across each of the armatures is of the same value, and the voltage across each of the windings of each of the control relays CR is zero due to the manner in which they are connected to each pair of motors, as has previously been described. The torque of each of these motors will be the same if the load on the motors is the same and the current supplied to each is the same. Assuming that each motor armature is operatively connected to and driving a wheel or a pair of driving wheels of a locomotive and that one wheel starts slipping slightly, there is a slight increase in speed of this armature and therefore a slight increase in the back voltage across the armature, which causes current flow through one winding of the control relay CR connected to this armature. Accordingly, the armatures of this relay will be moved upward, opening the circuit to the winding of the relay O1; its armature therefore drops down throwing the resistance N1 in series with the shunt field SH of the generator. The dropping of the armature of the contactor O1 simultaneously causes the circuit to the winding of the contactor O2 to be opened and its armature likewise drops down and inserts the resistance N2 in the separately excited field SP of the generator. The slight increase in back voltage due to overspeeding of any armature of a group caused by a slight slippage of any driving wheel thus causes the excitation current to be decreased instantaneously in both the shunt and separately excited fields of the generator supplying power to a group of motors by insertion of the resistances N1 and N2 in series with these fields and thereby lowers the power output of the generator or power input to the group of motors; this instantaneously and effectively prevents overspeeding of any one motor and therefore wheel slippage, as long as the coefficient of friction between the wheel and rail is low. The other drive and control systems located on the same locomotive or other locomotives connected thereto continue to drive as before, as the control relays thereof remain in their normal position. The locomotive engineer is warned of any wheel slippage by illumination of the signal lights 19 which are connected in parallel with the battery through the conductors in the train line conduit when the upper armature of any control relay CR moves upward and bridges the upper pair of contacts, but there is no necessity for him to reduce the power output of the prime movers or change the motor connections by movement of the master controller in order to reduce the torque of any of the motors to prevent slipping as is necessary with conventional control systems. With the automatic control means provided it will be evident that the wheels, having no tendency to slip, will continue to drive at full torque and those having a slight tendency to slip will be prevented from slipping, thus maintaining the tractive force of the locomotive or locomotives. It will be evident that the above automatic control means not only prevents damage to the motors, the parts driven thereby, and the rails, but allows the other motors, driving wheels having no tendency to slip, to operate at full torque and maintain the tractive force of a single locomotive or locomotives operating in multiple therewith, which is not possible with conventional multiple unit control systems not provided with these automatic means. When slippage starts, the automatic means acts instantaneously to prevent slippage and it is therefore not necessary to reduce the power input to all the motors controlled by the manually operable master controller which cannot be operated quickly enough upon operation of the overspeed alarm means to prevent overspeeding, and when operated reduces the torque of all the motors and therefore reduces the tractive effort and speed of the locomotive or locomotives, generally requiring restarting of the train pulled by one or a plurality of locomotive units.

It will be apparent to those skilled in the art that different groupings of the motors with the generator and different connections between the control relay and motor groups are possible to accomplish advantages similar to those mentioned in the above described detailed description taken in connection with the specific arrangement illustrated. For example, it is well known that the type of locomotive truck design and method of mounting the motors thereon determine the weight transfer characteristic between the individual axles and wheels when driving torque is applied thereto. Where a plurality of articulated trucks are used the weight on the leading axles of each truck is reduced and the weight on the trailing axle is increased when driving torque is applied to each axle, and the wheels on the leading axle are therefore more liable to slip. The motors therefore on the different trucks may be connected in different groups with the generator so that subtsantially equal torque is applied to the axles of each truck, and a control relay may be connected to one or more groups of motors so that the greatest sensitivity for wheel slip is obtained to suit the particular weight transfer characteristic and motor power connection provided. It will be apparent that variations in speed between the individual motors of a group caused by wheel slippage of any wheel cause variations in voltage in the individual motor circuits each of which includes a field winding. The control relay, therefore, may be connected across the field windings instead of the armature windings, as shown, and in some installations it has been found desirable to use a control relay for each group of motors rather than the method shown where a single relay is connected to a plurality of motor groups to control the power input thereto.

I claim:

1. In a drive and control system comprising a plurality of driving motors, a plurality of power sources for said motors, means for connecting groups of motors to an individual power source, output regulating means for each power source, and control means responsive to differences in speed between the motors of a group for controlling the output regulating means of each power source to prevent overspeeding of any individual motor of a group of motors.

2. In a drive and control system comprising a plurality of groups of driving motors, a plurality of power sources for said motors, each of said power sources comprising a generator and a prime mover for driving said generator, means for connecting each group of motors to an individual generator, output regulating means for each generator, and separate control means for each generator output regulating means, each of said control means being responsive to slight differences in speed between the motors of a group for controlling the output regulating means of the generator connected to a motor group in order to prevent overspeeding of any motor in a group of motors.

3. In a drive and control system comprising a plurality of power generating means, output regulating means for each of said power generating means, driving motors receiving power from each of said power generating means, control means for each of said output regulating means, said control means being responsive to slight differences in back voltage of the motors to reduce the power output of said power generating means, thereby preventing overspeeding of any one of said motors.

4. In a drive and control system comprising a plurality of groups of driving motors, a plurality of electrical power generating means, each power generating means adapted to supply power to a separate group of driving motors, output regulating means for each electrical power generating means, manually operable means for controlling all of said output regulating means, separate motor overspeed alarm means for each group of motors and separate control means responsive to a slight difference of speed between the motors of a group, each separate control means being adapted to control the output regulating means of a separate electrical power generating means supplying power to a separate group of motors in order to prevent overspeeding of any one motor of a group of motors, each of said control means also being adapted to control all of said alarm means simultaneously.

5. In a drive and control system comprising a plurality of groups of driving motors, a plurality of electric generators, a prime mover for driving each generator, output regulating means for each generator, output regulating means for each prime mover, separate power connections from each generator to each group of motors, contactors included in each of said separate power connections for connecting the motors of each group in series of parallel relation with a respective generator, a plurality of automatic control means, each of said control means being responsive to slight differences in back voltage between the motors of a group for controlling the output regulating means of each generator having separate power connections with a group of motors so that overspeeding of a motor of any group is prevented and manual means for simultaneously controlling all of said output regulating means for said prime movers and all of said contactors for changing the motor connection relations of each group of motors with respect to a respective generator.

6. In a drive and control system comprising a plurality of groups of driving motors, a plurality of generators, output regulating means for each generator, a prime mover for driving each generator, output regulating means for each prime mover, separate power connections from each generator to each group of motors, power operated contactors included in each of said separate power connections for connecting each group of motors in series or parallel with one of said generators, power operated means for operating each prime mover output regulating means, a plurality of automatic control means, each of said automatic control means being responsive to slight differences in back voltage between the motors of a group for controlling the output regulating means of the generator connected to a group of motors so that overspeeding of any one motor of a group is prevented, and a master controller for jointly controlling operation of all said power operated contactors and all of said power operated means for all of the prime mover output regulating means.

7. In a drive and control system comprising a plurality of groups of driving motors, a plurality of generators, separate means for connecting each generator to a separate group of motors, separate output regulating means for each generator, separate electromagnetic means for operating each generator output regulating means, a prime mover for driving each generator, separate output regulating means for each prime mover, separate electromagnetic means for operating each prime mover output regulating means, separate automatic means for controlling energization of each separate electromagnetic means operating a separate generator output regulating means, each of said automatic means being responsive to slight differences in back voltage between the motors of a group to cause a reduction in power output of the generator supplying power to a group of motors in order to prevent overspeeding of any motor of a group and a master controller for simultaneously controlling energization of all of said electromagnetic means operating each prime mover output regulating means.

8. In a drive and control system comprising a plurality of groups of driving motors, a plurality of generators, each of said generators having separate output regulating means, separate power connections from each generator to each group of motors, electromagnetic contactors included in each of said separate power connections for connecting the motors of a group in series or parallel with a respective generator, a plurality of relays, each relay being responsive to differential voltage between the motors of a group for controlling the output regulating means of the generator connected to a group of motors so that overspeeding of any one motor of a group is prevented, a plurality of prime movers, each prime mover being operatively connected to drive one of said generators, separate output regulating means for each prime mover, separate electromagnetic means for controlling each prime mover output regulating means and a master controller for controlling jointly the energization of all of said electromagnetic contactors and all of said electromagnetic means to simultaneously change the connections of each group of motors with respect to their respective generators and to simultaneously control the output of all of said prime movers.

9. In a drive and control system for a vehicle comprising a plurality of driving axles having driving wheels attached, a plurality of traction motors, each motor being operatively connected to drive an individual axle, a generator supplying power to said motors, generator excitation varying means, a prime mover for driving the generator, prime mover speed and output varying means, control means for said generator excitation varying means, said means acting promptly in response to slight differences in speed between the motors to cause a reduction in the generator excitation and therefore the generator output in order to promptly check overspeeding of any motor and therefore slippage of the wheels driven thereby, and manually operable control means for said prime mover speed and output regulating means, said manually operable control means including means adapted to be connected to other prime mover speed and output regulating means whereby the prime movers on other vehicles of the same type may be connected to and controlled in multiple from the same manually operable control means.

TORSTEN O. LILLQUIST.